(12) United States Patent
Ford et al.

(10) Patent No.: US 7,164,511 B2
(45) Date of Patent: Jan. 16, 2007

(54) DISTINGUISHING POSITIVE AND NEGATIVE FILMS SYSTEM AND METHOD

(75) Inventors: Gordon D. Ford, Round Rock, TX (US); Leland A. Lester, Austin, TX (US); David C. Iglehart, Austin, TX (US)

(73) Assignee: Eastman Kodak Company, Rochester, NY (US)

(*) Notice: Subject to any disclaimer, the term of this patent is extended or adjusted under 35 U.S.C. 154(b) by 1020 days.

(21) Appl. No.: 09/731,455

(22) Filed: Dec. 7, 2000

(65) Prior Publication Data

US 2003/0011827 A1    Jan. 16, 2003

Related U.S. Application Data

(60) Provisional application No. 60/173,615, filed on Dec. 29, 1999.

(51) Int. Cl.
*H04N 1/04* (2006.01)

(52) U.S. Cl. .................. 358/487; 358/474; 355/75; 348/96

(58) Field of Classification Search ........... 358/487, 358/506, 505, 474, 519, 443, 522, 500, 527, 358/1.17, 501, 406; 348/96; 355/18, 40, 355/75
See application file for complete search history.

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |

(Continued)

FOREIGN PATENT DOCUMENTS

DE      28 21 868 A1      11/1979

(Continued)

OTHER PUBLICATIONS

*New Adaptive Vector Filter Based on Noise Estimate*, Mei Yu, et al., IEICE Trans Fundamentals, vol. E82, No. 6, Jun. 1999.

(Continued)

*Primary Examiner*—Thomas D. Lee
*Assistant Examiner*—Heather D Gibbs
(74) *Attorney, Agent, or Firm*—David A. Novais; Roland R. Schindler

(57) ABSTRACT

A system and method for scanning a photographic film using a scanner automatedly identifies the film as either a positive or negative and controls the scanner settings to perform the scan accordingly. The method includes performing a pre-scan of the film, sampling a color density of at least one location of the film, comparing the color density to a standard range indicating an orange bias for the at least one location, and setting the scanner to treat the film as a negative if the color density is within the standard range and to otherwise treat the film as a positive.

6 Claims, 2 Drawing Sheets

U.S. PATENT DOCUMENTS

| | | | |
|---|---|---|---|
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,210,600 A * | 5/1993 | Hirata | 358/527 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,489,997 A * | 2/1996 | Usami | 358/522 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,751,343 A * | 5/1998 | Hibino et al. | 348/96 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,049,392 A * | 4/2000 | Kida | 358/1.17 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |

FOREIGN PATENT DOCUMENTS

| | | |
|---|---|---|
| DE | 196 36 867 C1 | 1/1998 |
| EP | 1 547 811 | 6/1979 |
| EP | 0 422 220 A1 | 4/1991 |
| EP | 0 482 790 B1 | 4/1992 |
| EP | 0 527 097 A2 | 2/1993 |
| EP | 0 569 142 A1 | 11/1993 |
| EP | 0 624 848 A2 | 11/1994 |
| EP | 0 669 753 A2 | 8/1995 |
| EP | 0 716 538 A2 | 6/1996 |
| EP | 0 751 670 A2 | 1/1997 |
| EP | 0 768 621 A2 | 4/1997 |
| EP | 0 794 454 A2 | 9/1997 |
| EP | 0 816 833 A2 | 1/1998 |
| EP | 0 816 833 A3 | 8/1998 |
| EP | 0 893 914 A2 | 1/1999 |
| GB | 2 283 633 A | 5/1995 |
| JP | 4-291139 | 10/1992 |
| JP | 11185028 | 7/1999 |
| JP | 2000-13604 | 1/2000 |
| JP | 2000-196813 A | 7/2000 |
| WO | WO 84/02019 | 5/1984 |
| WO | WO 89/06890 | 7/1989 |
| WO | WO 90/01240 | 2/1990 |
| WO | WO 91/09493 | 6/1991 |
| WO | WO 92/05469 | 4/1992 |
| WO | WO 95/15530 | 6/1995 |
| WO | WO 97/16028 | 5/1997 |
| WO | WO 98/31142 | 7/1998 |
| WO | WO 98/34397 | 8/1998 |
| WO | WO 99/40729 | 8/1999 |
| WO | WO 01/48694 | 7/2001 |

OTHER PUBLICATIONS

*A Robust Method for Parameter Estimation of Signal-Dependent Noise Models in Digital Images*, B. Aiazzi, et al., IEEE, 1997, pp. DSP 97-601-604.

*A Regularized Iterative Image Restoration Algorithm*, Aggelos K. Katsaggelos, et al., IEEE, 1991, pp. 914-929.

*Adaptive Fourier Threshold Filtering: A Method to Reduce Noise and Incoherent Artifacts in High Resolution Cardiac Images*, M. Doyle, et al., 8306 Magnetic Resonance in Medicine, May 31, 1994, No. 5, Baltimore, MD., pp. 546-550.

*Anisotropic Spectral Magnitude Estimation Filters for Noise Reduction and Image Enhancement*, Til Aach, et al., IEEE, 1996, pp. 335-338.

*Adaptive-neighborhood filtering of images corrupted by signal-dependent noise*, Rangaraj M. Rangayyan et al., Applied Optics, vol. 37, No. 20, Jul. 10, 1998, pp. 4477-4487.

*Grayscale Characteristics*, Photographic Negatives The Nature of Color Images, Digital Color Management, Giorgianni, et al., Jan. 1998, pp. 163-168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vison, 3, 7-38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/icetech.html. Aug. 5, 1999.

*2-D Adaptive Volterra Filter for 2-D Nonlinear Channel Equalisation and Image Restoration*, J.N. Lin, et al., Electronic Letters, vol. 28, No. 2, Jan. 16, 1992, pp. 180-182.

* cited by examiner

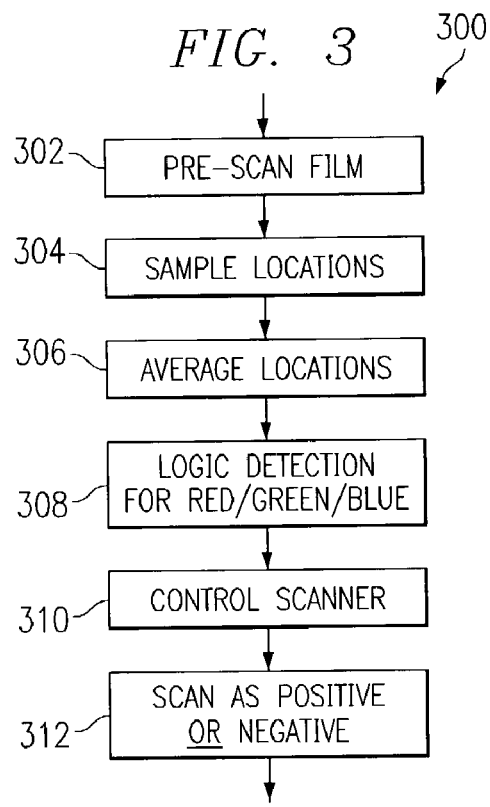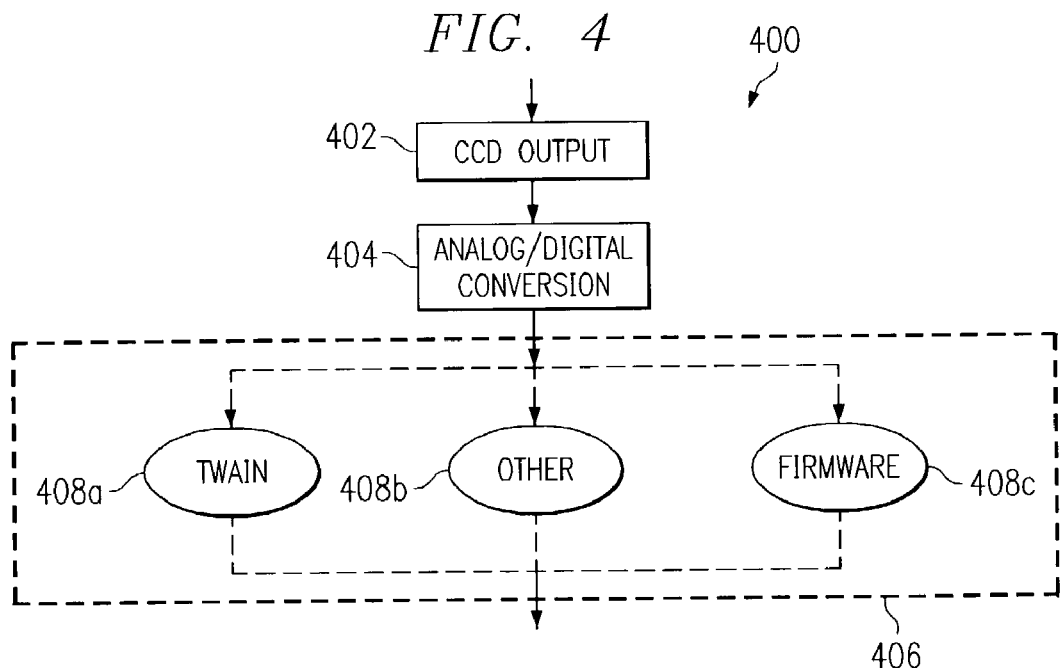

DISTINGUISHING POSITIVE AND NEGATIVE FILMS SYSTEM AND METHOD

PRIORITY APPLICATION

This application claims priority under 35 U.S.C. §119(e) from U.S. Provisional Patent Application Ser. No. 60/173,615 filed Dec. 29, 1999.

FIELD OF THE INVENTION

The present invention generally relates to films, imaging, and scanning and, more particularly, relates to systems and methods to automate determination of whether a film being scanned is a positive or negative and adjusting scanner settings accordingly.

BACKGROUND OF THE INVENTION

Conventional color photographic film scanners generally require the user to manually set the scanner for positive or negative films. Typically, the scanners include a switch or button that must be pressed to set the mode of the scanner for the appropriate film type, either positive or negative. If the positive or negative film type is not correctly set by the user, the scanner will not suitably read the film being scanned. Although conventional photographic films vary somewhat in makeup among manufacturers, all color photographic films have certain common characteristics. For example, the colors in photos from such films are generally composed of the three basic colors red, green, and blue. These three colors, in various combinations, create the full spectrum of colors for photographs developed from the film.

An ever continuing trend in photograph processing, including digital film development, is the furthering of automation of the process. The more automated the process, the easier the process is to use, there is reduction in chances of error (because of decreased human involvement and otherwise), and there is generally an overall improvement in efficiency. It is an advantage, therefore, to provide further automation of digital film processing activities.

In particular, it would be a significant improvement and advantage in the art and technology to provide automated systems and methods for distinguishing between positive and negative films when scanning the films.

SUMMARY OF THE INVENTION

An embodiment of the invention is a method for scanning a photographic film using a scanner. The method includes performing a pre-scan of the film, sampling the film to detect a characteristic indicative of a positive or negative and then comparing the characteristic to a standard to determine if the film a positive or negative.

Another embodiment of the invention is a method for scanning a photographic film using a scanner. The method includes performing a pre-scan of the film, sampling a color density of at least one location of the film, comparing the color density to a standard range indicating an orange bias for the at least one location, and setting the scanner to treat the film as a negative if the color density is within the standard range and to otherwise treat the film as a positive.

Another embodiment of the invention is a method of scanning a photographic film using a scanner. The method includes the step of determining, automatedly (i.e., that is, the determination is made in an automatic manner), whether the film is a positive or a negative. In other aspects, the method also includes controlling the scanner to properly scan the film based on the determination of the positive or negative.

Yet another embodiment of the invention is a system for distinguishing between positive film and negative film. The films exhibit a red, a green, and a blue illumination characteristic. The system includes a scanner, having a sensor device. The sensor device detects the red, the green, and the blue. The system also includes an analog output from the sensor device indicative of the red, the green, and the blue, an analog-to-digital converter, connected to the sensor device, for receiving the analog output, a digital output from the analog-to-digital converter, connected to the analog-to-digital converter, a microprocessor system, including a microprocessor and a memory, connected to the digital output, a logic module, connected to the microprocessor system, wherein the logic module determines relative densities of the red, the green, and the blue, and a control connection, connected to the microprocessor system and the scanner, reactive to relative densities determination by the logic module in order to control the scanner.

Another embodiment of the invention is a scanner system for digitizing a film. The scanner system includes a sensor system operable to detect a characteristic of the film and control system operable to set control functions in response to the characteristic.

Yet another embodiment of the invention is a method for digitizing a film. The method includes detecting, automatedly, a characteristic of the film, scanning the film, and adjusting, automatedly, the step of scanning based on the characteristic.

Another embodiment of the invention is a system for digitizing a film having a characteristic. The system includes an automated detector of the characteristic and a controller, connected and responsive to the automated detector.

BRIEF DESCRIPTION OF THE DRAWINGS

FIG. 3 is a method of distinguishing between positive and negative films, employable in conjunction with a scanning device, according to embodiments of the present invention; and FIG. 4 is a method of incorporating the method of FIG. 3 in a conventional scanner and microprocessor network, according to embodiments of the present invention.

DETAILED DESCRIPTION

Photographic film scanners must be set to properly view (or read) films as either positive or negative film. Manual set of the film scanner to treat film as the applicable positive or negative type is necessary in order for the scanner to properly function. The embodiments described herein further automate the film scanning process and provide accuracy and efficiency to the process. In particular, the embodiments provide systems and methods for measuring a characteristic of a film, which characteristic is indicative of whether the film type is positive or negative. From the measurement, the systems and methods here described automatedly adjust the film scanner settings to treat the film as the correct positive or negative type for the scanning operation.

Various characteristics of photographic films can allow distinguishing between positive and negative film types. One such characteristic, although not the only one, is that negative films tend to have an orange bias. That is, there is high density of what appears to be orange color hues as light passes through the film. The orange color appearance is a result of the particular densities of the red, blue, and green colors from the film. Positive films, on the other hand, have smaller contrast radiance, or more white, as light is passed through the films. A particular manufacturer's film can be measured to determine relative levels of a characteristic indicative of positive or negative, for example, the greater extent of orange bias in negative versus positive films. The measurements can then be used to assess whether any particular film is a positive or negative, based on the characteristic (e.g., orange bias) exhibited by the film.

Conventionally, the assessment of the indicative characteristic, for example, the extent of orange bias or some other characteristic, in a particular film to determine whether the film is a positive or negative has been performed by human subjective viewing. Based on the human determination, the human has manually set the scanner controls for the apparent film type of positive or negative. The present embodiments automate the determination.

Figure 1:
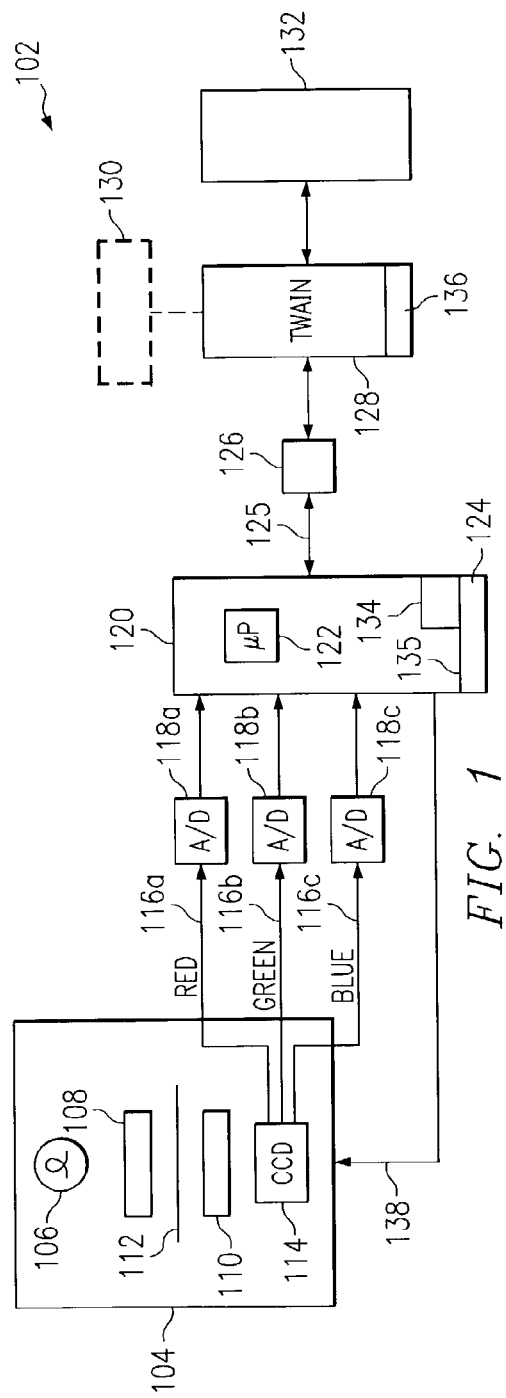
FIG. 1 is a system for distinguishing between positive and negative films in a scanning device, according to embodiments of the present invention.

Referring to FIG. 1, a system 102 for distinguishing between positive and negative photographic films includes a film scanner 104. The film scanner 104 includes a light source 106, one or more lenses 108, 110, and a sensor system 114, which may be, for example, a charge coupled device (CCD), CMOS imager, or other photo sensitive device. The lenses 108, 110, are generally disposed between the light source 106 and the sensor system 114, on either side of a film 112. Although a single lens 108 and a single lens 110 are shown disposed on either side of the film 112 in FIG. 1, it is to be understood that the lenses 108, 110 are intended only as exemplary and additional, other, and different lens arrangements are all possible in the scanner 104.

The film 112 is a conventional color photography film, such as those manufactured by Kodak, Fuji, and others. The composition of the film 112 and its characteristics will vary according to the particular manufacturer. In conjunction with the present description, it is to be understood that positive films exhibit certain different characteristics than negative films, notwithstanding the particular film manufacturer source. For example, one such characteristic is orange bias of the film. Negative films exhibit greater orange bias than positive films. The range of orange bias in positive and negative films in every event will be dictated by the particular film characteristics, and it is necessary that the characteristics of the particular film in any instance, by virtue of knowing the manufacturer and the manufacturer's practices, is important for operation of the system 102.

In FIG. 1, the film 112 is shown on edge, as if the film is located horizontally extending into the Figure and between the lenses 108, 110. As is conventional in the scanner 104, the light source 106 delivers light through the lens 108, the film 112, and the lens 110, to impinge upon the sensor system 114. At each sensor of the sensor system 114, the intensity of illumination which passes through the lenses 108, 110 and the film 112 is measured.

The sensor system 114 generally detects the three different hues—red, green and blue. The data from the sensor system 114 is separately streamed for the red, green and blue sensors of the sensor system 114 over the connections 116a, 116b, and 116c. The connections 116a–c respectively correspond to the red, green, and blue detections. The signals from the sensor system 114 over the connections 116a–c are each delivered to an analog to digital converter 118a–c. As those skilled in the art will know and appreciate, the analog to digital converters 118a–c can be separate, distinct elements, one for each hue and connection 116a–116c; or, alternatively, a single or other plurality of analog to digital converter elements can be employed to perform the same function of converting the signals from the sensor system 114 corresponding to each of the separate hues into separate sets of digital information.

The outputs of the analog to digital converters 118A–C are separately delivered to a microprocessor system 120. The microprocessor system 120 is, for example, a conventional personal computer, such as an Intel Pentium-based personal computer. The microprocessor system 120 includes a microprocessor 122 and a memory 124. The system 120 must be capable of storing fairly large amounts of digital information corresponding to scanning results and performing rather speedy manipulations of such information.

Associated with the microprocessor system 120 is a physical interface 126 to a TWAIN driver 128. The physical interface 126 can be circuitry of the microprocessor system 120 if the TWAIN driver 128 resides in the microprocessor system 120, or can be circuitry connecting to another source, such as the scanner 104, where the TWAIN driver 128 could alternatively reside. The physical interface 126 could, moreover, connect to any other separate peripheral or device within the microprocessor system 120, with the same result of connecting the TWAIN driver 128.

The TWAIN driver 128 is a scanner software interface, which provides a standardized interface widely adopted by the scanner industry. Although the TWAIN standard may vary from time-to-time, it is inconsequential for the purposes herein except that certain embodiments can, as part of or as an addition to the TWAIN driver 128, include appropriate logical mechanisms 136 (as hereinafter further discussed) for analysis to distinguish between positive and negative films. Alternatively, similar logical mechanisms 135 can be maintained in the memory 124 or as firmware 134 in the microprocessor system 120. Of course, the location of the logical mechanism 135 or 136 can be in other portions of the system 102 or even in or related to external devices (not shown) to the system 102, provided the mechanism 135, 136 provides the logical functions necessary to determine orange bias levels in films, and thus, distinguish between positive and negative films (as such determinations are later described more fully herein).

The TWAIN driver 128, in addition to being connected to the physical interface 126, is connected to the user interface 130, and possibly also certain applications 132, such as application software. The user interface 130 can be a software graphical user interface (GUI) or any other conventional interface allowing a user to receive and input data and control signals. The application 132 can likewise be a wide variety of applications, providing a variety of functions, for example, the application 132 can be software that allows image editing functions, such as PhotoShop™ or other common software.

A control connection 138 connects the microprocessor system 120 to the scanner 104. The control connection 138 delivers control signals generated by the microprocessor system 120 to the scanner 104. In response to a determination by the logical mechanism 135, 136 that the film 112 in the scanner 104 is either positive or negative, the microprocessor system 120 signals over the control connection 138 to the scanner 104. The signal over the control connection 138 causes a scanner 104 to treat the film 112 either as positive or negative, in accordance with the determination made by the system 102. Settings of the scanner 104 are initialized accordingly, to perform scanning functions as appropriate for the particular film type of positive or negative. In this manner, the scanner 104 correctly scans the film 112 as positive or negative, whichever the film 112 is in fact. The scanner 104 can also include a button toggle (not shown), for example, the conventional button for manually setting the scanner, to override the automatic setting. This is one method and system for determining a characteristic indicative of a positive or negative film.

Figure 2:
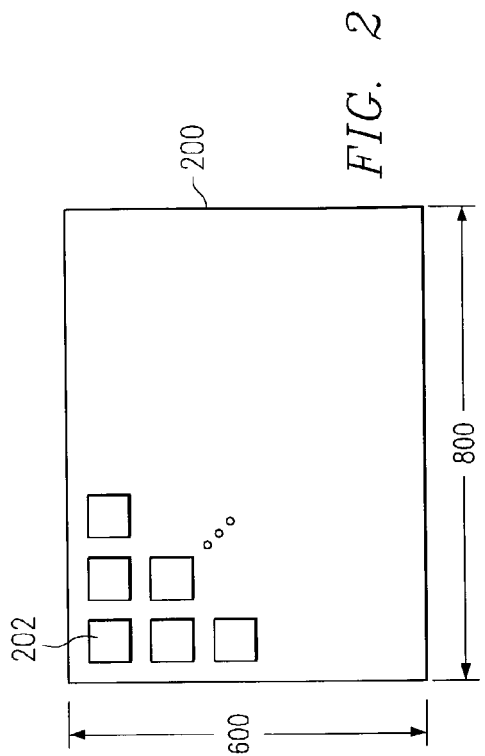
FIG. 2 is a digitized 800×600 pixel image, according to embodiments of the present invention.

Referring to FIG. 2, an exemplary pixel image 200 includes a plurality of pixels 202. The image 200 is, for example, an 800×600 pixel image. In the image 200, there are 800 columns of the pixels 202 and, in each column, there are 600 individual ones of the pixels 202. Each of the pixels 202 is illuminated (or not) in combinations of the primary hues of red, green or blue. The image 200 is exemplary of the result at the microprocessor system 120, by virtue of the TWAIN driver 128, of scanning the film 112 by the scanner 104. The signals 116a–c from the sensor system 114 of the scanner 104, on conversion to digital signals at the analog to digital converters 118a–c, are the array of digital data that yields the pixels 202 of the image 200.

Within the image 200, there are regions of the image 200 which have an orange tint bias (not shown in detail). The orange tint bias, in an 8-bit digital system 102, has a make up of approximately the following relative densities:

Red>than approximately 150;
Green>than approximately 75; and
Blue<than approximately 50;

where there are 0–255 counts on each color (i.e., a 256 bit scale). The foregoing values are intended as illustrative only, for an 8-bit system, and will vary for other systems and may also even vary in any particular 8-bit system. Orange bias of the portions of the image 200 will have a strong-high red density, a medium-high green density, and low blue density. By detecting portions of the image 200 having red, green, and blue densities within the ranges yielding the orange bias, the orange bias of the film 112 is measured. As previously mentioned, if the orange bias is high (i.e, a large portion of the film 112 exhibits orange bias), then the film 112 is a negative, and if the orange bias is low (i.e., the film 112 does not exhibit significant orange bias), then the film 112 is positive. Where substantial portions of the film 112 would yield the image 200 with significant orange bias (according to the film manufacturer's particular film characteristics), then the film 112 is a negative and the scanner 104 can be automatedly set accordingly via control signals over the control connection 138. Otherwise, the film 112 is a positive and the scanner 104 can alternatively be automatedly set accordingly, also by control signals passed over the control connection 138.

Referring to FIG. 3, a method 300 for distinguishing a positive or negative film, for example, utilizing the system 102, is initiated by placing the film 112 in the scanner 104. Once the film 112 is in the scanner 104, a prescan step 302 is performed. In the prescan step 302, a somewhat lower resolution, speedy scan is performed by the scanner 104. From this prescan step 302, all or portions of the film 112, sufficient for a positive or negative characteristic determination (e.g., determination of extent of orange bias), provide information as the signals 116a–c indicating certain features of the film 112, for example purposes herein, the red, green, and blue content of the film 112.

In a step 304, either all or various locations of the film 112 are sampled in portions. The sampled portions from the step 304 are measured for red, green and blue densities. When the red, green, and blue densities indicate a significant orange bias (for example, according to the relative density ranges listed above), the determination can be made that the film is a negative. In the event of no significant orange bias, the determination can be made that the film is a positive.

In a next step 306, the various locations sampled in the step 304 are averaged for the entire film 112. The averaging in the step 306 can be performed in a variety of manners, for example, linear average, weighted average, or some other statistical method. In any event, the particular step 306 of averaging is accomplished in a manner that gives a ready determination of the significance of orange bias in the film 112.

In a step 308, a logic determination is made by the microprocessor system 120 to determine whether the measures of red, green, and blue for the average of the locations is within a (min, max) range. The (min, max) range will typically be as previously described for the red, green, and blue, however, because films vary according to manufacturer, the particular (min, max) ranges to determine orange bias will be best left to individual determination for specific scanners and films. In any event, the logic determination in the step 308 tests the actual readings of the scanner 104, as converted to digital format by the converters 118a–c and delivered to the microprocessor system 120, for the determination of orange bias.

In a step 310, the microprocessor system 120, based on the logic determination step 308 and the result of whether or not significant orange bias is present in the film 112, controls the scanner 104. Control signals are delivered to the scanner 104 from the microprocessor system 120 over the control connection 138. The control signals necessary to trigger the scanner 104 to treat the film 112 as positive or negative will be dependent upon the scanner protocols of the particular scanner 104. The scanner protocols may vary according to scanner manufacturer, however, the protocols will, in every event, provide for the scanning of either negatives or positives. The control signals should trigger the scanner 104 to implement appropriate settings of the scanner 104 in order that the scan of the film 112 will be appropriate according to the positive or negative type of the film 112.

The scanner 104, in a step 312, performs a full scan of the film 112, with settings of the scanner set for the appropriate positive or negative type of the film 112. This full scan step 312 performed by the scanner 104 is dictated by the particular operational characteristics implemented in the scanner 104 by the scanner manufacturer. By utilizing a prescan step 302, then logically determining the orange bias density of the film 112 in the steps 304, 306, 308, and controlling the scanner 104 in the step 310, all prior to the full scan 312, the full scan 312 is precisely accomplished treating the film 112 as its appropriate type of either positive or negative.

Referring to FIG. 4, a further detailed illustration of the possible mechanisms for performing the steps 304, 306, 308 and 310 of FIG. 3 is illustrated in detail. The sensor system 114, upon detecting at its various sensors of the sensor system 114 the light throughput through the film 112 at its various regions, outputs in a step 402 certain analog electrical signals indicative of the measured characteristic of the film 112, such as red, green, and blue density measurements. The analog signals from the sensor system 114 are converted in a step 404 to digital electrical signals representative of the red, green, and blue analog signals. The digital signals from the step 404 are thereafter logically analyzed, such as by the sampling 304, averaging 306, and logical determination 308 of FIG. 3. The sampling 304, averaging 306, and logic determination 308 can be performed by a variety of devices, elements, or features, including, for example, hardware, software, the microprocessor system 120, peripheral devices (not shown), combinations of the foregoing, and others. Several possibilities include that the TWAIN driver 128 can implement a TWAIN version 408A of the steps 304, 306, 308. Alternatively, the firmware 134 of the microprocessor system 120 can implement a firmware version 408c of the steps 304, 306, 308. Of course, there are other possibilities (as previously mentioned and as otherwise will be known to those skilled in the art) to perform the steps 304, 306 and 308, and all these other possibilities are exemplified in FIG. 4 by the other version 408b. In every event, regardless of the particular device or process implementing the method 300, the method 300, in conjunction with the system 102 or some other system, measures a density of orange bias and from that measurement determines the film characteristic of positive or negative. From that determination of the film characteristic, the scanner is controlled to properly read the film as a positive or negative.

Numerous alternatives are possible in accordance with the foregoing concepts. Although much of the foregoing describes the characteristic of orange bias as an indicator of negative versus positive film, other characteristics of film can be measured and relatively compared in order to distinguish between positive and negative films. Films could even include an identification tag that describes the type of the film or indicates the appropriate development process for the film. Furthermore, although the prescan by the scanner can be employed to make the characteristic measurement, the measurement can alternatively or additionally be made at other times in the scanning procedure or at other steps of the film development process. Moreover, the control signals to the scanner that are indicative of the type of film and that control the scanner settings can be from some other source than a microprocessor system, for example, the scanner itself can include the software or hardware logic necessary to make the evaluation of the measured characteristic and control the scanner or the logic can be supplied from other equipment or sources.

One particular alternative embodiment is that of a kiosk photograph development system. Such kiosk would include substantially the same elements of the embodiments described above, however, the form of those elements and the way in which those elements are performed can be varied with the same result overall. For example, application specific equipment, software, hardware, logic, circuitry, and other aspects can be employed in the kiosk or in some other setting. In a general public consumer oriented environment, such as the kiosk, automation that distinguishes film type, as well as possibly other aspects of the film that are critical to the development process.

In the foregoing specification, certain specific embodiments have been described. Those of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for scanning a photographic film that may be a positive or negative film type, comprising the steps of successively:
    performing a pre-scan of the photographic film using a scanner;
    sampling a color density of at least one location of the film;
    comparing the color density to a standard range indicating an orange bias for the at least one location that is high enough to represent only a negative film type; and
    setting the scanner to treat the photographic film as a negative film type if the color density is within the standard range and to otherwise treat the photographic film as a positive film type.

2. The method of claim 1, wherein the standard range is a mix of red, green, and blue in relative proportions, in an 8-bit system,
    the red is greater than 150;
    the green is greater than 75; and
    the blue is less than 50.

3. The method of claim 1, wherein the color density is determined for each of red, green and blue.

4. The method of claim 3, wherein the color density for each of the red, green and blue is averaged for the red, green and blue, respectively, for each of the at least one locations and the average is employed in the step of comparing.

5. A method of preparing a scanner to scan a photographic film that may be a positive or negative film type, comprising the steps of successively:
    measuring respective color densities of three different color hues, red, green and blue, in the photographic film;
    comparing the color densities to a standard range which indicates an orange bias that is high enough to represent only a negative film type; and
    triggering the scanner to treat the photographic film as a negative film type automatically when the color densities are within the standard range and to otherwise treat the photographic film as a positive film type automatically when the color densities are not within the standard range.

6. A method of preparing a scanner to scan a photographic film that may be a positive or negative film type, comprising the steps of successively:
    measuring color characteristics of the photographic film;
    determining whether the color characteristics are within a particular range that indicates an orange bias high enough to represent a negative film type and not a positive film type; and
    triggering the scanner to treat the photographic film as a negative film type automatically when the color densities are within the particular range and to otherwise treat the photographic film as a positive film type automatically when the color densities are not within the particular range.

* * * * *